(12) United States Patent
Okuyama

(10) Patent No.: US 6,513,934 B1
(45) Date of Patent: Feb. 4, 2003

(54) PROJECTION APPARATUS AND OBSERVATION APPARATUS

(75) Inventor: Atsushi Okuyama, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/502,652

(22) Filed: Feb. 11, 2000

(30) Foreign Application Priority Data

Feb. 17, 1999 (JP) .......................................... 11-038216

(51) Int. Cl.$^7$ ........................ G03B 21/00; G03B 21/14; G02F 1/1335
(52) U.S. Cl. ................................ 353/31; 353/20; 349/5
(58) Field of Search ...................... 353/8, 9, 20, 30–34, 353/37, 38, 81, 82, 98, 99; 349/5–9

(56) References Cited

U.S. PATENT DOCUMENTS

| | | | |
|---|---|---|---|
| 5,073,013 A | 12/1991 | Sonehara et al. | 359/63 |
| 5,626,409 A | 5/1997 | Nakayama et al. | 353/31 |
| 5,929,946 A * | 7/1999 | Sharp | 349/18 |
| 6,070,982 A * | 6/2000 | Aritake | 353/20 |
| 6,089,717 A * | 7/2000 | Iwai | 335/31 |
| 6,123,424 A * | 9/2000 | Hayashi et al. | 353/20 |
| 6,128,049 A * | 10/2000 | Butterworth | 349/5 |
| 6,147,802 A * | 11/2000 | Itoh et al. | 359/500 |
| 6,331,060 B1 * | 12/2001 | Yamamoto et al. | 353/31 |
| 6,340,230 B1 * | 1/2002 | Bryars et al. | 353/31 |
| 6,379,010 B1 * | 4/2002 | Suzuki et al. | 353/31 |

FOREIGN PATENT DOCUMENTS

| | | | |
|---|---|---|---|
| JP | 63-116123 | 5/1988 | G02F/1/133 |
| JP | 2505758 | 4/1996 | H04N/9/31 |

* cited by examiner

*Primary Examiner*—Russell Adams
*Assistant Examiner*—Melissa Koval
(74) *Attorney, Agent, or Firm*—Morgan & Finnegan, L.L.P.

(57) ABSTRACT

A projection apparatus having a light source, a color separating system for separating the light from the light source into a plurality of color beams, a plurality of light modulating elements for modulating the separated color beams, based on an image signal, a color combining system for combining the modulated color beams, and a projection optical system for projecting composite light of the combined color beams, onto a screen. The color combining system incorporates a cross dichroic prism with dichroic films on joint surfaces between four prisms, each of the color beams incident to the cross dichroic prism is converted into linearly polarized light, and the following relation is met:

$$0° < \theta < 90°$$

where $\theta$ is an angle between a polarization direction of a color beam component transmitted by all the dichroic films and a polarization direction of a color beam component reflected by the dichroic film.

22 Claims, 16 Drawing Sheets

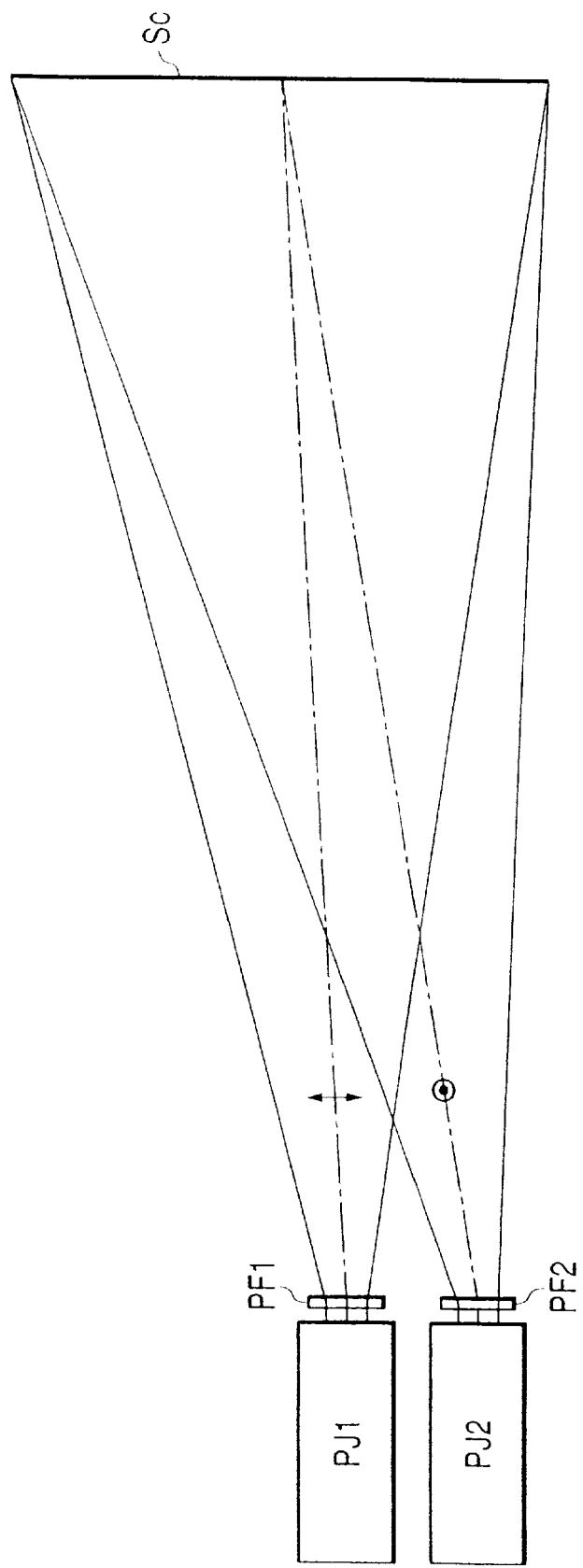

PROJECTION APPARATUS AND OBSERVATION APPARATUS

BACKGROUND OF THE INVENTION

1. Field of the Invention

The present invention relates to an apparatus for projecting an image and an apparatus for observing an image and, more particularly, to those suitably applicable to liquid crystal projectors using a liquid crystal display element (liquid crystal panel) as an image display element and constructed to project an image obtained thereby through a projection lens, for example, onto a polarizing screen and to image observation systems constructed to permit observation of an enlarged and projected image from a screen of a computer, a picture of a video camera, or the like.

2. Related Background Art

A variety of proposals have been made heretofore as to the image projection devices (liquid crystal projectors) constructed to illuminate the liquid crystal panel with light from a light source, display an image on the liquid crystal panel, and enlarge and project an image based on transmitted or reflected light from the liquid crystal panel, through the projection lens onto the screen.

FIG. 17 is a schematic diagram of major part of a conventional image projection apparatus. In FIG. 17 reference numeral 101 designates a white light source. Numeral 102 designates a reflector. Numeral 103 represents a visible-light-transmitting filter for removing the components of light except for the visible light.

Numeral 104 indicates an integrator for yielding a uniform illumination area, which is comprised of fly's eye lenses 104a, 104b each consisting of an array of lenses. Numeral 105 denotes an array of polarization converting elements for converting non-polarized light into linearly polarized light polarized in a predetermined direction of polarization, each element consisting of a polarization separating surface 105a, a reflecting surface 105b, and a half-wave plate 105c.

Numeral 106 represents a condenser lens. Numeral 107 designates a first dichroic mirror, 108 a second dichroic mirror, and 109a and 109b reflecting mirrors. Numeral 110 stands for a relay system for relaying the illumination light, which is comprised of relay lenses 110a, 110b and relay mirrors 110c, 110d.

Symbols 111r, 111g, and 111b are condenser lenses for images (light beams) of the colors of R (Red), G (Green), and B (Blue), respectively. Symbols 112r, 112g, and 112b are image display elements for R, G, and B, respectively. Numeral 113 represents a cross dichroic prism DP for color composition. Numeral 114 stands for a projection lens.

The white light emitted from the white light source 101 is collected by the reflector 102 and then travels through the integrator 104, the polarization converting element array 105, and the condenser lens 106. After that, the light is separated into the color beams of R, G, and B light by the dichroic mirrors 107, 108. The first color light (B in the figure) is guided via the reflecting mirror 109b and condenser lens 111b to the image display element 112b, the second color light (G in the figure) is guided via the condenser lens 111g to the image display element 112g, and the third color light (R in the figure) is guided via the relay system 110 and condenser lens 111r to the image display element 112r.

The color beams of R, G, and B, traveling through the image display elements 112b, 112g, and 112r and modulated according to image signals, are then combined into one by the cross dichroic prism DP 113, whereby the images displayed on the respective image display elements are enlarged and projected in a superimposed manner onto the screen (not illustrated) through the projection lens 114. A discharge lamp such as a metal halide lamp, a mercury lamp, or the like is used as the white light source.

FIG. 18 shows an example of spectral distribution of the white light source 101. From the white light having the continuous spectral distribution as illustrated, the dichroic mirrors DM1, DM2 create the three color beams of R, G, and B, for example, having respective spectral distributions as illustrated in FIG. 19.

In the conventional apparatus, these light beams are modulated by the respective image display elements 112r, 112g, 112b and thereafter combined by the cross dichroic prism DP. In order to avoid loss in light amount in the cross dichroic prism DP, dichroic films of the cross dichroic prism are designed so that light reflected thereby is s-polarized light components of red (R) and blue (B) while the light of green (G) transmitted by the dichroic films of the cross dichroic prism DP is a p-polarized light component.

The reason is that, from the characteristics of the dichroic films as illustrated in FIG. 20, a broader reflection band can be set in the case of the s-polarized light components being reflected by the dichroic films (BRs, RRs) and a broader transmission band can be set in the case of the p-polarized light component being transmitted by the dichroic films (GTp). This suppresses the loss of light amount in the dichroic prism due to the so-called incident angle characteristics of the dichroic films, which are variations in cut wavelengths of the dichroic films due to variations in angles of incidence of light to the dichroic films.

In order to realize this structure, where the polarization directions of the image beams emerging from the image display elements were as illustrated in FIG. 21, the apparatus was so constructed that a half-wave plate was placed in each of the three paths of the emergent beams and that the slow phase axis directions of the phase plates were set so as to make the polarization direction of G light perpendicular to the polarization direction of R and B light and so as to make the polarization direction of G light coincident with that of the p-polarized light with respect to the dichroic films of the dichroic prism DP.

In systems necessitating alignment of the polarization directions of projected light on the occasion of projection of image (for example, such as polarized image projection systems using the polarizing screen or stereoscopic image projection systems for projecting images for the right eye and for the left eye with beams having respective polarization directions different from each other), however, the polarization direction of G light has to be aligned with the polarization direction of R and B light by providing a polarizing means at an arbitrary position in the optical path from the dichroic prism to the polarizing screen or to the observer.

The reason is as follows. When the polarization direction of light reflected by the polarizing screen is set in parallel to the s-polarized light component of the dichroic prism, the color beam of green is absorbed. When the polarization direction of light reflected by the polarizing screen is set in parallel to the p-polarized light component of the dichroic prism, the color beams of red and blue are absorbed. This will result in failing to reproduce a correct color image.

It is then conceivable, for example, to convert the beams into the polarization directions inclined at 45° relative to the polarization direction SC of the screen by the half-wave plates as illustrated in FIGS. 22A and 22B, or to convert the polarized beams into circularly polarized light beams by quarter-wave plates as illustrated in FIGS. 23A and 23B. FIG. 22A shows the relationship between the polarization directions of the beams (R, B, and G beams) emerging from the dichroic prism and the slow phase axis direction of the phase plates (indicated by the dashed line), and FIG. 22B shows the relationship between the polarization directions of the projected beams and the transmission-axis direction of the polarizing screen. FIG. 23A shows the relationship between the polarization directions of the beams (R, B, and G beams) emerging from the dichroic prism and the slow phase axis direction of the phase plates (indicated by the dashed line), and FIG. 23B shows the relationship between the polarization directions of the projected beams and the transmission-axis direction of the polarizing screen.

In such use ways, however, the intensity of the projected light decreases as follows because of absorption of light by a polarizing plate on the polarizing screen.

$$\cos^2(45)=0.5$$

Therefore, this poses another problem that brightness of the projected image becomes half, and the structure is not suitable for the image projection systems requiring the alignment of polarization directions.

If the polarization directions of the respective color beams incident to the dichroic prism are preliminarily aligned with each other there can be little loss of brightness at the polarizing screen. However, this will narrow the widths of the reflection and transmission bands of the dichroic films, as illustrated in FIG. 24, thus decrease margins for the wavelength components of the respective color beams transmitted or reflected by the dichroic prism, and increase the loss of light amount due to the incident angle characteristics of the dichroic films.

SUMMARY OF THE INVENTION

An object of the present invention is to provide a projection apparatus and an observation apparatus that can achieve higher utilization efficiency of light than the conventional apparatus.

A projection apparatus according to one aspect of the present invention is a projection apparatus comprising means for supplying light, a color separating system for separating the light from the means into a plurality of color beams, a plurality of light modulating elements for modulating the respective color beams separated by the color separating system, based on an image signal, a color combining system for combining the color beams emerging from the respective light modulating elements, and a projection optical system for projecting composite light of the color beams combined by the color combining system onto a plane, wherein the color combining system comprises a plurality of dichroic films, each of the color beams incident to the cross dichroic film is a linearly polarized light, and the following relation is met:

$$0°<\theta<90°$$

where θ is an angle between a polarization direction of a color beam component transmitted by all the dichroic films and a polarization direction of a color beam component reflected by the dichroic film.

Another projection apparatus according to a further aspect of the present invention is a projection apparatus comprising means for supplying light, a color separating system for separating the light from the means into a plurality of color beams, a plurality of light modulating elements for modulating the respective color beams separated by the color separating system, based on an image signal, a color combining system for combining the color beams emerging from the respective light modulating elements, and a projection optical system for projecting composite light of the color beams combined by the color combining system, onto a polarizing screen, wherein the color combining system comprises a plurality of dichroic films, each of the color beams incident to the dichroic film is a linearly polarized light, and the following relation is met:

$$0°<\theta<90°$$

where θ is an angle between a polarization direction of a color beam component transmitted by all the dichroic films and a polarization direction of a color beam component reflected by the dichroic film, and wherein a half-wave plate is placed in an optical path from the color combining system to the polarizing screen, and an angle between the polarization direction of the color beam component transmitted by all the dichroic films and a transmission polarization direction of the polarizing screen is substantially equal to an angle between the polarization direction of the color beam component reflected by the dichroic film and the transmission polarization direction of the polarizing screen.

In a preferred form of the above projection apparatus, the half-wave plate is provided at an exit side of a projection lens of the projection optical system.

In a preferred form of the above projection apparatus, the half-wave plate is provided between the color combining system and a projection lens of the projection optical system.

In a preferred form of the above projection apparatus, a slow phase axis of the half-wave plate rotates about the optical axis of the projection optical system.

Another projection apparatus according to a further aspect of the present invention is a projection apparatus comprising means for supplying a plurality of color light beams, a plurality of light modulating elements for modulating the respective color beams, based on an image signal, a color combining system which has a plurality of dichroic films for combining the color beams emerging from the respective light modulating elements, and a projection optical system for projecting composite light of the color beams combined by the color combining system onto a plane, wherein each of the color beams incident to the dichroic film of the color combining system is converted into linearly polarized light, and the following relation is met:

$$0°<\theta<90°$$

where θ is an angle between a polarization direction of a color beam component transmitted by all the dichroic films and a polarization direction of a color beam component reflected by the dichroic film.

In a preferred form of the above projection apparatus, a half-wave plate is provided at an exit side of a projection lens of the projection optical system.

In a preferred form of the above projection apparatus, a half-wave plate is provided between the color combining system and a projection lens of the projection optical system.

In a preferred form of the above projection apparatus, a slow phase axis of the half-wave plate rotates about the optical axis of the projection optical system.

In a preferred form of the above projection apparatus, the polarization direction of the color beam component reflected by the dichroic film is s-polarized light to the dichroic films.

In a preferred form of the above projection apparatus, the angle e satisfies the following relation:

$$0° < \theta < 80°.$$

In a preferred form of the above projection apparatus, the angle θ satisfies the following relation:

$$0° < \theta < 60°.$$

In a preferred form of the above projection apparatus, the angle θ satisfies the following relation:

$$0° < \theta < 45°.$$

In a preferred form of the above projection apparatus, the angle θ satisfies the following relation:

$$\theta = 45°.$$

An observation apparatus according to a further aspect of the present invention is an observation apparatus with which an observer, wearing polarizing glasses to which light beams of polarization states different from each other are incident selectively to the left eye and to the right eye, observes a stereoscopic image from parallax images projected onto a polarizing screen, which preserves polarization directions, by first and second projection devices, wherein each of the first and second projection devices comprises means for supplying light, a color separating system for separating the light from the means into a plurality of color beams, a plurality of light modulating elements for modulating the respective color beams separated by the color separating system, based on an image signal, a color combining system comprising a cross dichroic prism with dichroic films on joint surfaces between four prisms, for combining the color beams emerging from the respective light modulating elements, a projection optical system for projecting composite light of the color beams combined by the color combining system, onto the polarizing screen, and a polarizer placed in an optical path from the cross dichroic prism to the polarizing screen, the polarizer having a polarization axis directed along a direction which bisects an angle between a polarization direction of a color beam component transmitted by all the dichroic films and a polarization direction of a color beam component reflected by the dichroic film, wherein each of the color beams incident to the dichroic film is a linearly polarized light, and the following relation is satisfied:

$$0° < \theta < 90°$$

where θ is the angle between the polarization direction of the color beam component transmitted by all the dichroic films and the polarization direction of the color beam component reflected by the dichroic film, and wherein a phase plate capable of altering a polarization state of light is set at an exit position of an image projection optical system of at least one of the first and second image projection devices, whereby polarization states of light beams projected from the two projection devices are made different from each other.

In a preferred form of the above observation apparatus, the angle θ satisfies the following relation:

$$0° < \theta < 80°.$$

In a preferred form of the above observation apparatus, the angle θ satisfies the following relation:

$$0° < \theta < 60°.$$

In a preferred form of the above observation apparatus, the angle θ°satisfies the following relation:

$$0° < \theta < 45°.$$

In a preferred form of the above observation apparatus, the angle θ satisfies the following relation:

$$74 = 45°.$$

A system according to a further aspect of the present invention is a system for projecting a video picture by either of the projection apparatus described above.

A system according to a further aspect of the present invention is a system for projecting an image produced by a computer, by either of the projection apparatus described above.

In a preferred form of the above apparatus, $$\theta = 80°.$$

BRIEF DESCRIPTION OF THE DRAWINGS

FIG. 14 is a schematic diagram to show the major part of a portion of Embodiment 5 of the present invention;

DETAILED DESCRIPTION OF THE PREFERRED EMBODIMENTS

Figure 1:
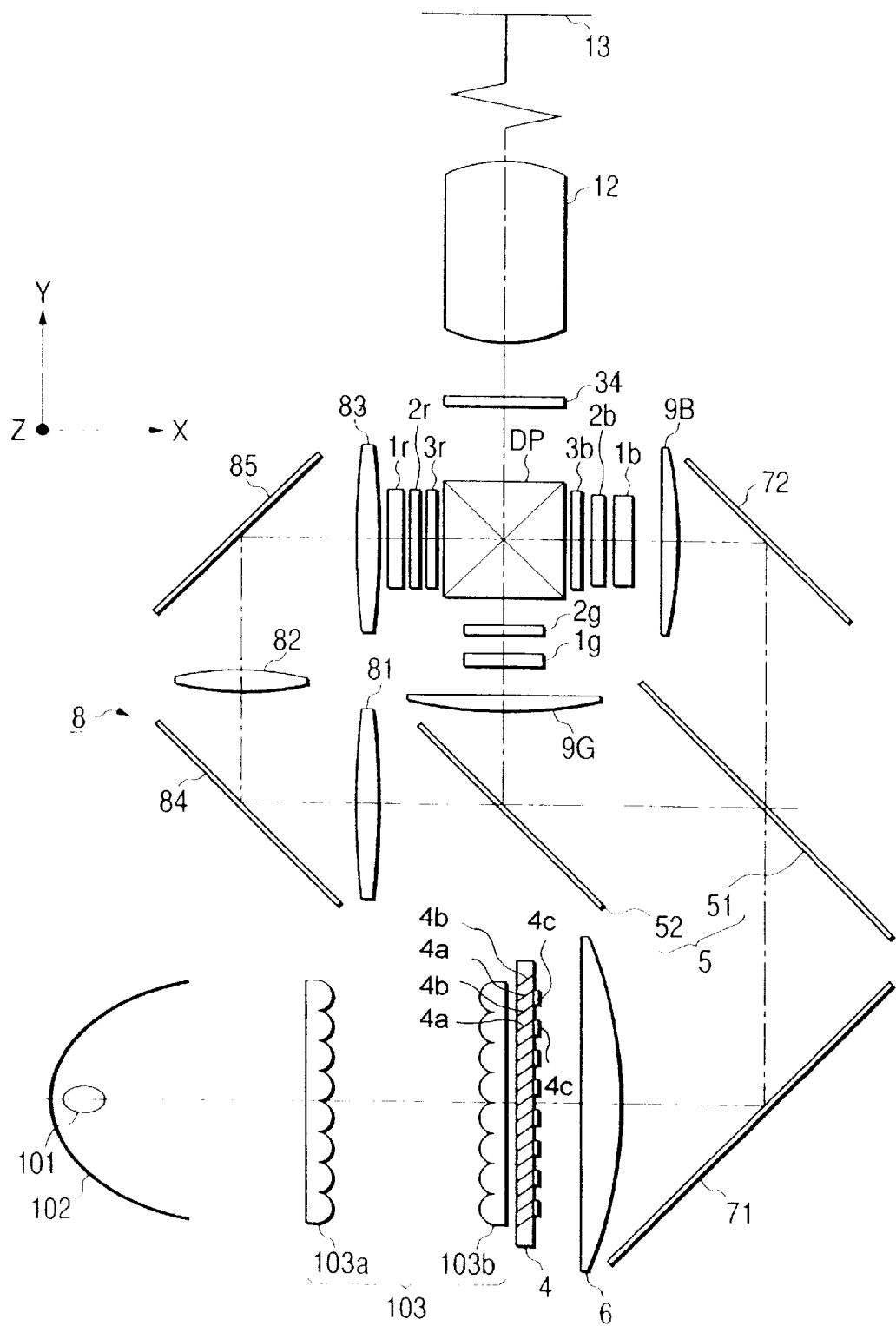
FIG. 1 is a schematic diagram to show the major part of Embodiment 1 of the present invention.

FIG. 1 is a schematic diagram to show the major part of Embodiment 1 of the present invention. In the figure reference numeral 101 designates a light source (lamp) such as a metal halide lamp, a mercury lamp, or the like. Numeral 102 denotes a reflector comprised of a parabolic surface or an ellipsoidal surface.

Numeral 103 indicates an integrator consisting of a first lens array 103a and a second lens array 103b. Numeral 4 represents a polarization converting element array consisting of a plurality of polarization separating surfaces 4a, a plurality of reflecting surfaces 4b corresponding to the polarization separating surfaces 4a, and a plurality of phase plates 4c. Numeral 5 stands for a color separating system consisting of dichroic mirrors 51, 52.

Numerals 71 and 72 denote mirrors. Numeral 8 is a relay system having condenser lenses 81, 82, 83 and mirrors 84, 85, and 1r, 1g, and 1b are image display elements for red, for green, and for blue, using the liquid crystal. Symbols 2r, 2g, and 2b represent sheet polarizers as analyzers of light from the image display elements 1r, 1g, 1b, and symbols 3r and 3b half-wave plates for converting the polarization direction of light in the R light path and in the B light path, respectively. DP represents a cross dichroic prism as a color combining system.

Numeral 12 indicates a projection lens having a positive refracting power, for enlarging and projecting the images displayed on the respective image display elements. Numeral 6 stands for a condenser lens for condensing diffused light from the polarization converting element array 4 onto the image display elements.

Symbols 9G and 9B denote condenser lenses for condensing the illumination light onto the projection lens 12.

The optical paths of FIG. 1 will be described. Beams of part of the light from the light source 101 are incident directly to the first lens array 103a and the other beams are reflected by the reflector 102 and then enter the first lens array 103a. The first lens array 103a focuses these beams to form a plurality of secondary light source images near the second lens array 103b.

Beams from the plurality of secondary light source images near the second lens array 103b are incident to the corresponding polarization converting elements. The polarization converting element array 4 converts the beams into beams aligned in a certain polarization direction (s-polarized light) and the beams from the array 4 are incident to the condenser lens 6.

The beams from the plurality of secondary light source images formed near the second lens array 103b travel via the condenser lens 6 and the condenser lens 9B (or 9G, or the relay system 8) to illuminate the image display element 1b (1g, or 1r) as a surface to be illuminated, in a superimposed manner thereon.

Here the white light from the condenser lens 6 is reflected by the mirror 71 to be made incident to the dichroic mirror 51. The blue light is transmitted by the dichroic mirror 51, then is reflected by the mirror 72, and is condensed by the condenser lens 9B, thereby illuminating the image display element 1b for blue.

Among the green light and red light reflected by the dichroic mirror 51 the dichroic mirror 52 reflects the green light but transmits the red light.

The green light reflected by the dichroic mirror 52 is condensed by the condenser lens 9G to illuminate the image display element 1g for green.

The red light transmitted by the dichroic mirror 52 is condensed by the relay system 8 to illuminate the image display element 1r for red. The images of the respective color beams from the image display elements 1b, 1g, 1r are guided through each element (a polarizing plate 2, a half-wave plate 3) illustrated in the enlarged view of FIG. 3 and thereafter are combined by the cross dichroic prism DP (hereinafter referred to as a dichroic prism DP). Then they are guided through a half-wave plate 34 to be enlarged and projected through the projection lens 12 onto the polarizing screen 13.

Figure 2:
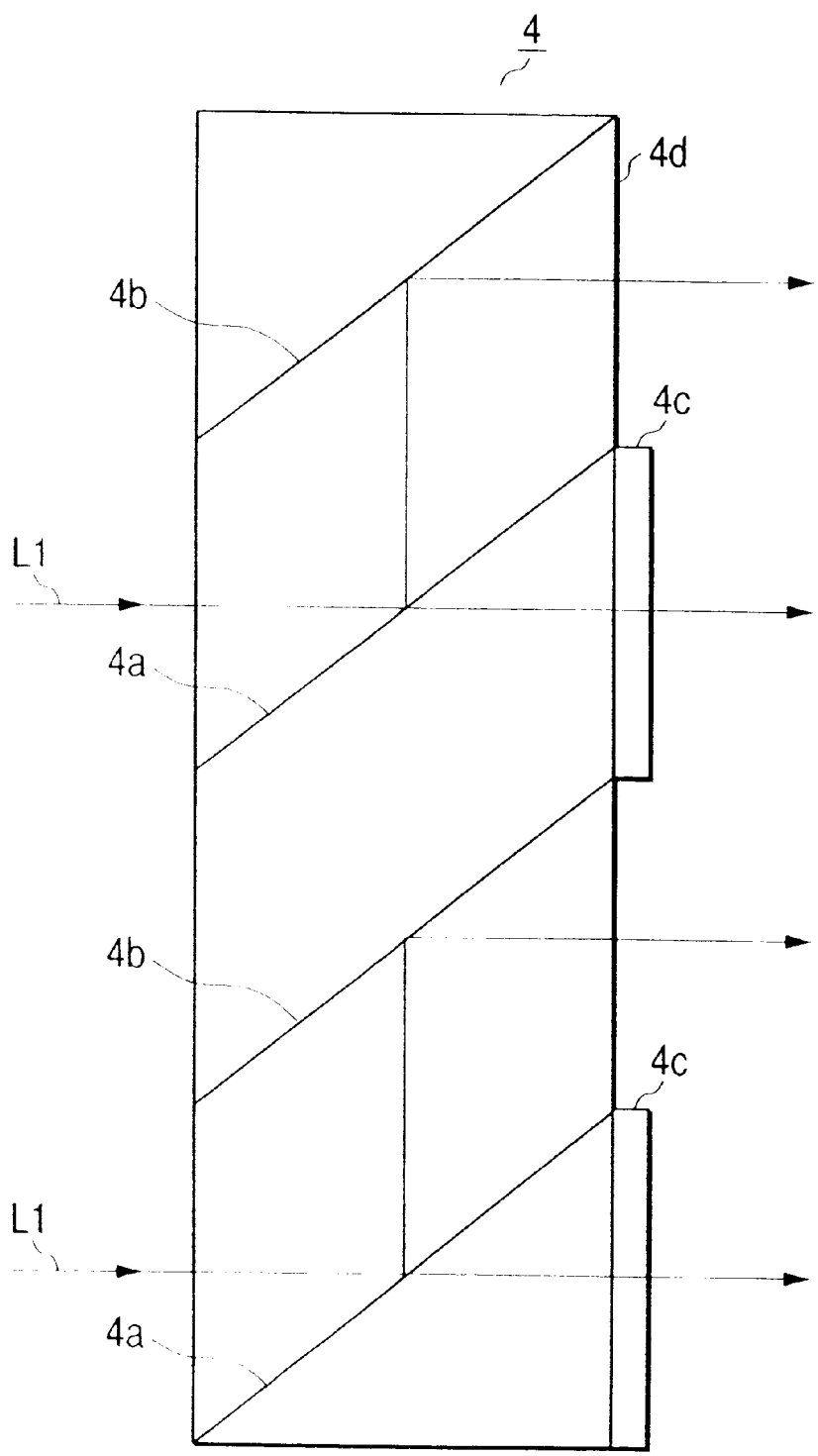
FIG. 2 is an explanatory diagram to show an enlarged view of a portion of FIG. 1.

The polarization converting element array 4 transmits the p-polarized light but reflects the s-polarized light out of the incident light LI, at the polarization separating surfaces 4a each provided with a polarization separating film, as illustrated in the enlarged view of FIG. 2. The p-polarized light transmitted by the polarization separating surfaces 4a out of the incident light travels through the half-wave plates 4c with the polarization direction thereof being turned 90°, so that it is converted into the s-polarized light. Thus the s-polarized light emerges from the array 4.

On the other hand, the s-polarized light reflected by the polarization separating surfaces 4a is reflected by the reflecting surfaces 4b to emerge from exit surfaces 4d. According to this action, the element array 4 functions to output beams of linearly polarized light of the s-polarized light from the incident light.

Figure 3:
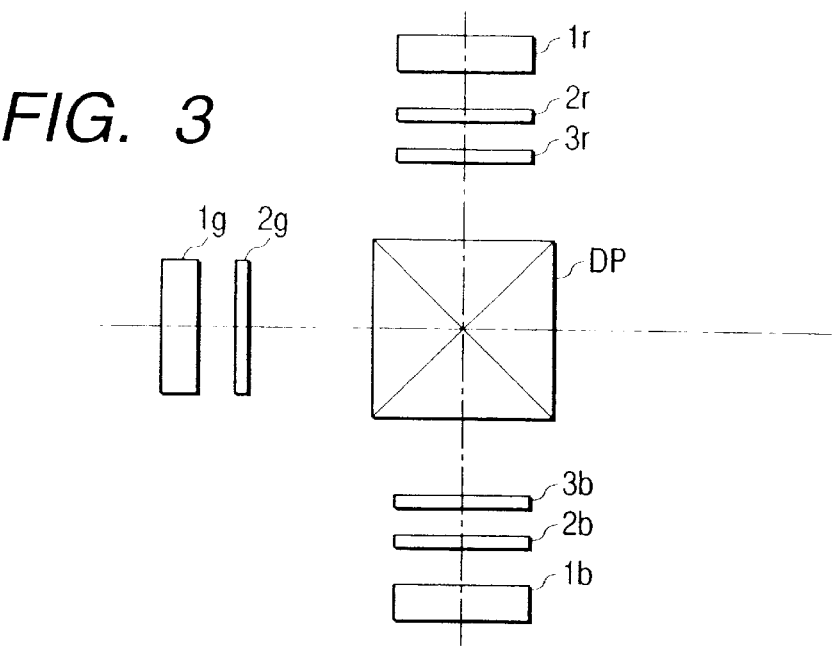
FIG. 3 is an explanatory diagram to show an enlarged view of a portion of FIG. 1.

FIG. 3 is an enlarged view to show the major part near the cross dichroic prism DP in Embodiment 1 of the present invention.

FIG. 3 shows the structure of each optical system from the image display element 1r, 1g, or 1b to the dichroic prism DP. In FIG. 3 symbols 1r, 1g, and 1b designate the image display elements for red (R), for green (G), and for blue (B), and 2r, 2g, and 2b the polarizers as analyzers for the light from the image display elements.

Symbols 3r and 3b denote the half-wave plates for converting the polarization direction of the beams in the R light path and in the B light path.

Figure 4:
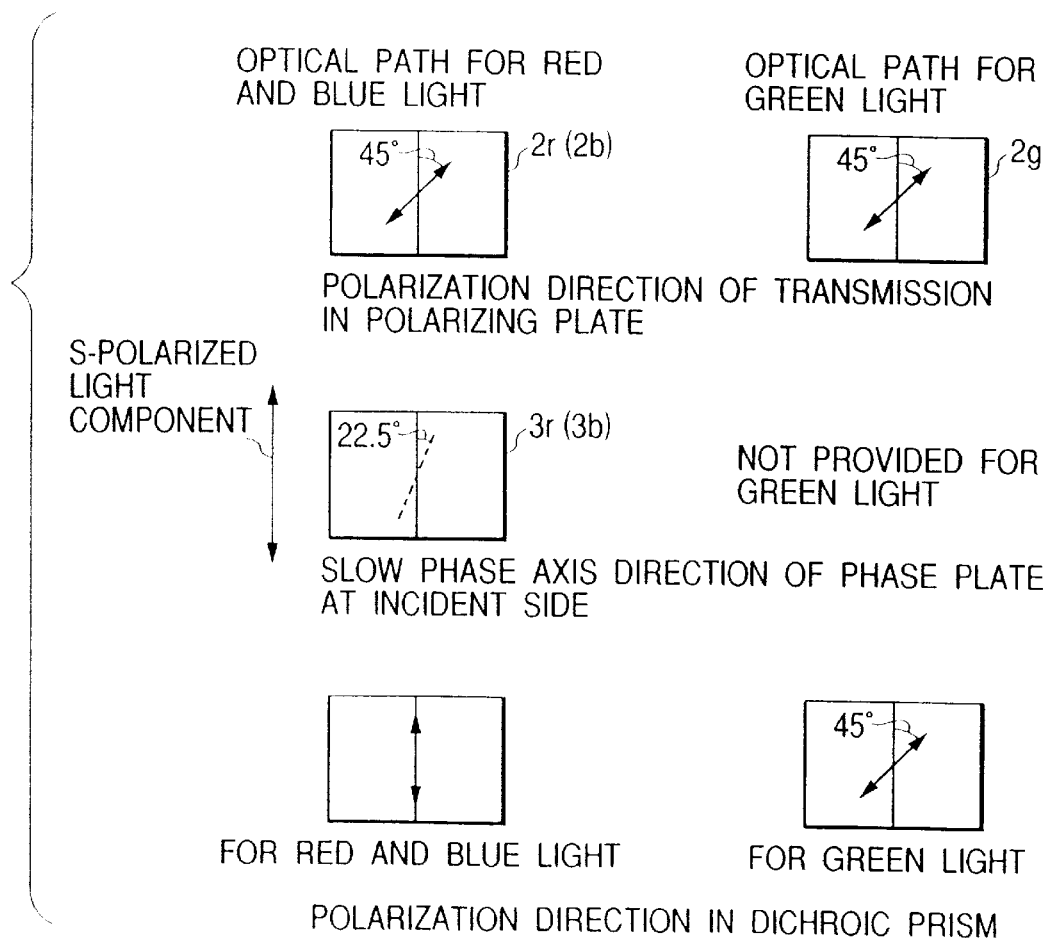
FIG. 4 is a diagram to explain the polarization directions of projected light in Embodiment 1 of the present invention.

FIG. 4 shows the directions of polarization in each of the optical elements used in the present embodiment. At the image display elements 1r, 1g, 1b, the polarization directions of the image beams indicated by the arrows in the figure make 45° relative to the direction of the s-polarized light component (polarized light in the vertical direction on the plane of the drawing) of the dichroic films of the dichroic prism. At the polarizers 2r, 2g, 2b, the polarization direction of transmitted light (referred to as a transmission polarization direction) indicated by the arrows in the figure is set in parallel (0°) to the polarization direction of the image beams from the image display elements. At the phase plates 3r, 3b, the direction indicated by the dotted line in the figure indicates the slow phase axis direction, this direction being set at 22.5° relative to the direction of the s-polarized light component of the dichroic films of the dichroic prism.

Based on this arrangement, the polarization direction of the red light and blue light is converted into that of the s-polarized light component of the dichroic films of the dichroic prism DP and thereafter the s-polarized red or blue light is incident to the dichroic prism DP. Since the green light is incident to the dichroic prism without changing the polarization direction at the exit of the image display element 1g, the polarization direction of the green light is inclined at 45° relative to the s-polarized light component of the dichroic films, so that the angle between the polarization direction of the light passing through all the dichroic films and the polarization direction of the light once reflected by the dichroic film is 45°.

Figure 5:
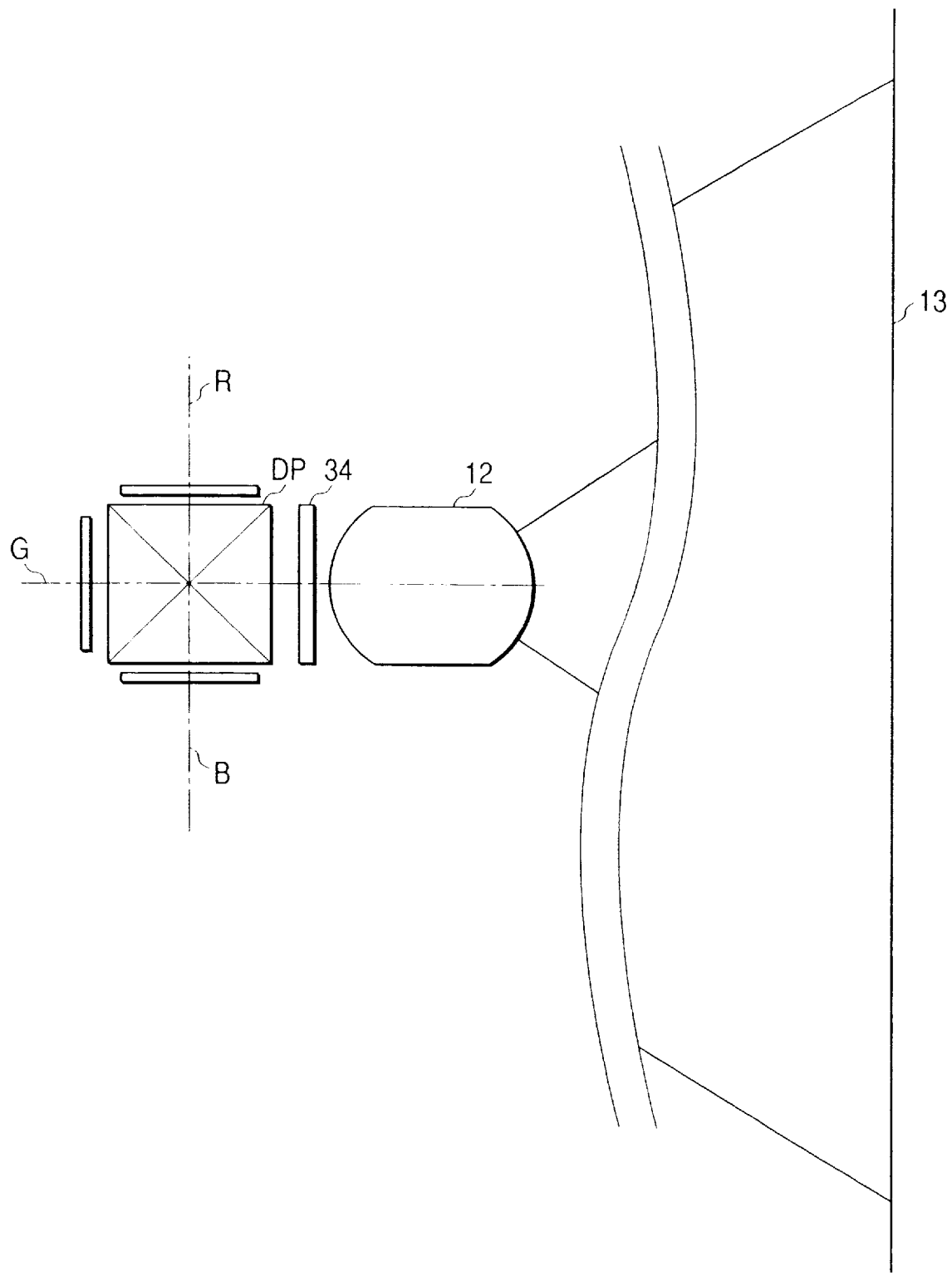
FIG. 5 is an explanatory diagram to explain a portion in Embodiment 1 of the present invention.

FIG. 5 shows the optical system from the cross dichroic prism DP to the polarizing screen 13 in Embodiment 1 of the present invention. In FIG. 5 symbol DP represents the cross dichroic prism (dichroic prism), 34 the half-wave plate for converting the polarization direction of the light combined by the prism DP, 12 the projection lens, and 13 the polarizing screen.

In the present embodiment, the polarization direction of the red and blue light emerging from the dichroic prism DP is coincident with that of the s-polarized light with respect to the dichroic films of the dichroic prism DP, while the polarization direction of the green light emerging from the prism DP is inclined at 45° relative to the polarization direction of the red and blue light.

Figure 6A:
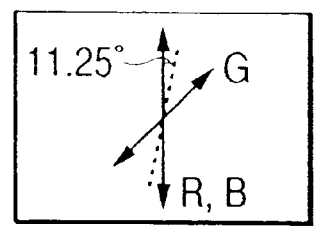
FIG. 6A and FIG. 6B are diagrams to explain the polarization directions of projected light in Embodiment 1 of the present invention.
Figure 6B:
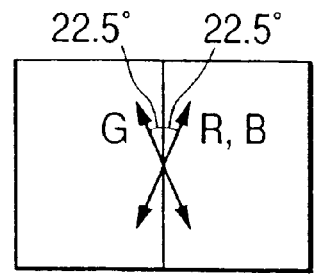

Relations of the slow phase axis direction of the half-wave plate 34 and the transmission polarization direction of the polarizing screen 13 against the polarization directions of this projected light are presented in FIGS. 6A and 6B. FIG. 6A shows the relationship between the polarization directions of the beams (R, B, and G light) emerging from the dichroic prism and the slow axis direction (dotted line) of the half-wave plate 34, and FIG. 6B shows the relationship between the polarization directions of the beams (R, B, and G light) projected onto the polarizing screen 13 and the transmission axis direction of the polarizing screen.

In FIG. 6A the slow axis direction (dotted line) of the half-wave plate 34 is set at the angle of 11.25° relative to the direction of the s-polarized light in the dichroic films of the dichroic prism DP. Passing through the half-wave plate 34, the beams of the three colors of R, G, and B from the prism DP are converted each into light of the polarization direction inclined at 22.5° relative to the direction of the s-polarized light in the dichroic films of the dichroic prism DP. Since the transmission polarization direction of the polarizing screen 13 is set in parallel to the direction of the s-polarized light in the dichroic films of the dichroic prism, the rate of the light that can be utilized for observation without being absorbed by the screen 13, is computed as follows.

$$\cos^2(22.5)=0.853$$

This means that 85.3% of the projected light is allowed to pass through the polarizing screen 13 and to be utilized.

Figure 7:
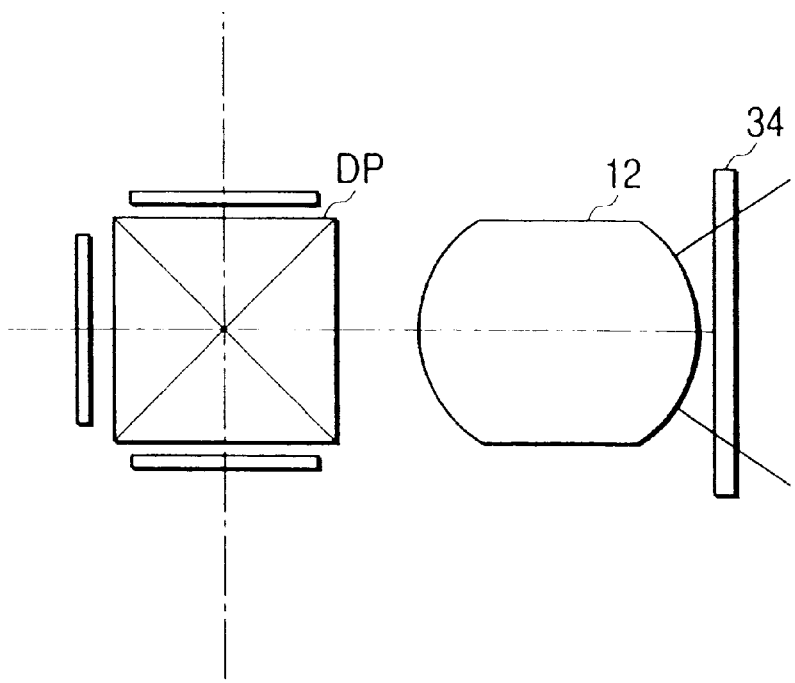
FIG. 7 is a modification of a portion in Embodiment 1 of the present invention.

In the present embodiment the utilization efficiency of light is improved greatly as compared with 50% in the conventional apparatus. The half-wave plate 34 can be positioned anywhere between the dichroic prism DP and the polarizing screen 13, and it may also be constructed so as to be detachably mounted on the exit side of the projection lens 12 as illustrated in FIG. 7.

As described above, the present embodiment suppresses the loss of light amount occurring in the use of the beams with their polarization directions aligned, by setting the angle to 45°, smaller than 90°, between the polarization direction of the color beam component transmitted by all the dichroic films of the cross dichroic prism and the polarization direction of the color beam components once reflected by the dichroic film of the cross dichroic prism, in the color beams incident to the cross dichroic prism for color composition.

At this time it is preferable that the polarization direction of the color beam components once reflected by the dichroic film be coincident with that of the s-polarized light to the dichroic films and that the color beam component transmitted by all the dichroic films be inclined at the angle larger than 0° but smaller than 90° relative to the s-polarized light, because the loss of light amount due to the incident angle characteristics of the dichroic films can be suppressed more than in the case of the polarization directions of the respective color beams being aligned and because in the systems without using the polarizing screen the loss of light amount can be decreased in the dichroic films.

It is also preferable that the color light transmitted by all the dichroic films be the green light and the color light reflected by the dichroic film be the red and blue light, because the loss of light amount is little in the dichroic films. The angle between the two polarization components is desirably 80° or less, because the light amount is increased 17% or more. More desirably, the angle is not more than 60°, because the light amount is increased 50% or more. Still more desirably, the angle is not more than 45°, because the light amount is increased 70% or more.

Figure 8:
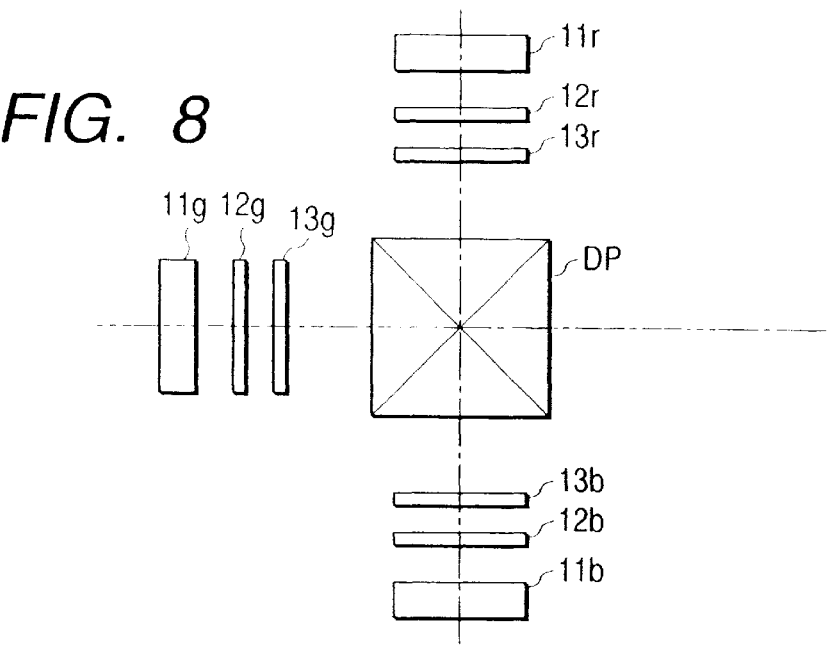
FIG. 8 is a schematic diagram to show the major part of a portion of Embodiment 2 of the present invention.

FIG. 8 is a schematic diagram to show the major part of a portion of Embodiment 2 of the present invention. FIG. 8 shows the structure of the portion from the image display elements 11r, 11b, 11g to the dichroic prism DP.

In FIG. 8 symbols 11r, 11g, and 11b designate the image display elements for red (R), for green (G), and for blue (B). Symbols 12r, 12g, and 12b denote the polarizers as analyzers for the light from the image display elements.

Symbols 13r, 13g, and 13b represent the half-wave plates for converting the polarization direction of the associated color light, which are placed in the optical paths of the respective colors of R, G, and B.

Figure 9:
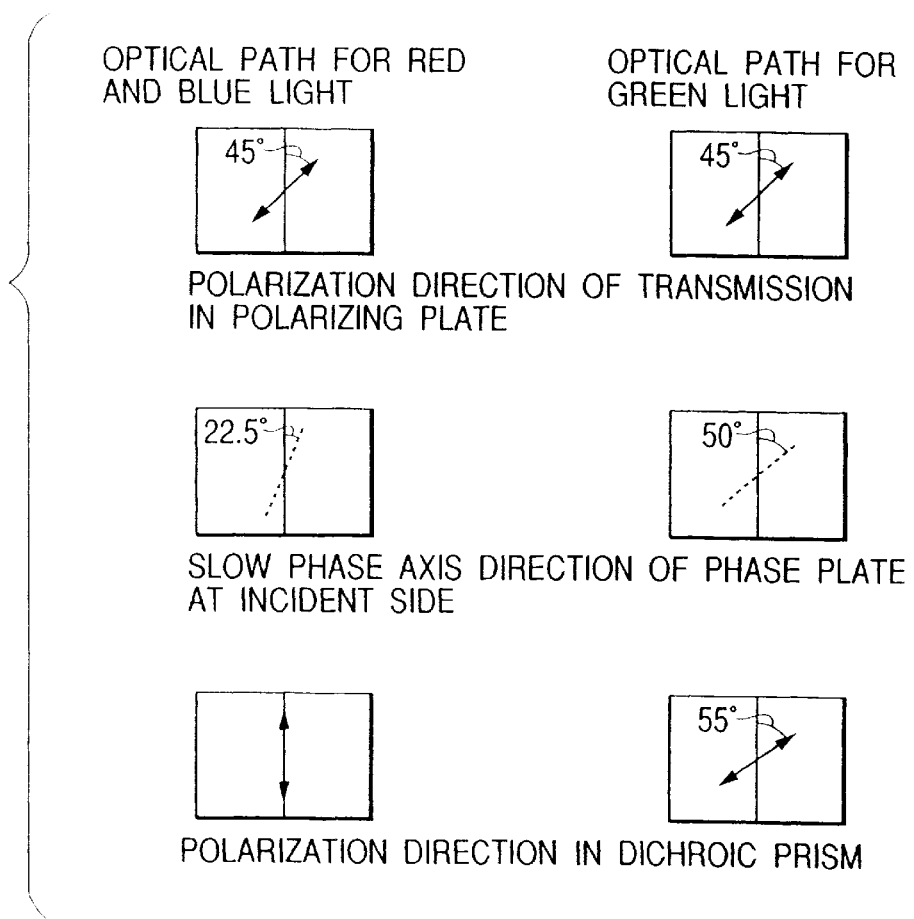
FIG. 9 is a diagram to explain the polarization directions of projected light in Embodiment 2 of the present invention.

The directions of polarization in the respective optical elements used in the present embodiment are presented in FIG. 9. At the image display elements 11r, 11g, 11b, the polarization direction of the image light indicated by the arrows in the figure is inclined at 45° relative to the direction of the s-polarized light component in the dichroic films of the dichroic prism DP. At the polarizers 12r, 12g, 12b, the transmission polarization direction indicated by the arrows in the figure is parallel (0°) to the polarization direction of the image light from the image display elements. At the phase plates 13r, 13g, 13b, the directions indicated by the dotted lines in the figure are the slow axis directions, the phase plates 13r, 13b in the optical paths of the respective colors of R and B are set at 22.5° relative to the direction of the s-polarized light component in the dichroic films of the dichroic prism DP, and the phase plate 13g in the optical path G is set at 50°.

Based on this arrangement, the polarization direction of the red and blue light is converted into that of the s-polarized component in the dichroic films of the dichroic prism DP and thereafter the red and blue light is incident to the dichroic prism DP.

In contrast with it, the system is so set that the polarization direction of the green light is converted into the polarization direction inclined at the angle of 55° relative to the s-polarized light component in the dichroic films of the dichroic prism DP and thereafter the green light is incident to the dichroic prism. This achieves the effect similar to that in Embodiment 1.

Figure 10:
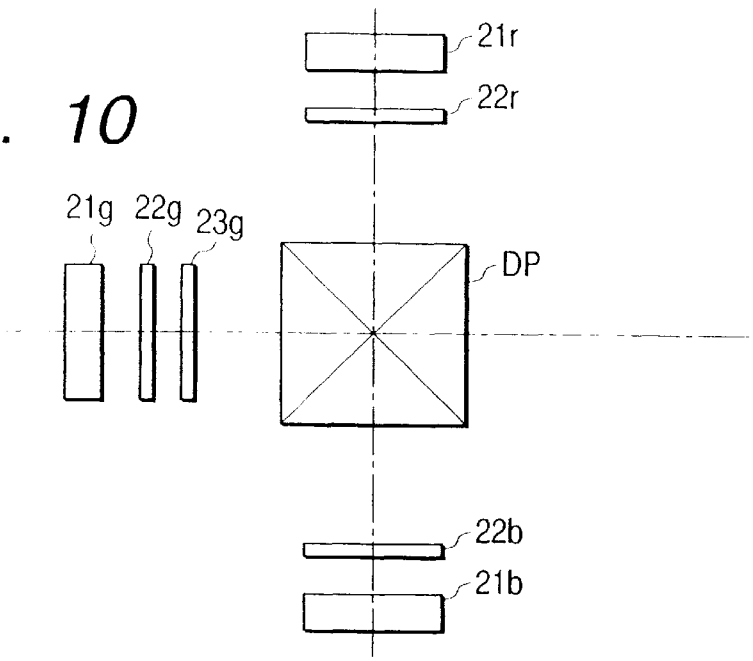
FIG. 10 is a schematic diagram to show the major part of a portion of Embodiment 3 of the present invention.

FIG. 10 is a schematic diagram to show the major part of a portion of Embodiment 3 of the present invention. FIG. 10 shows the structure of the portion from the image display elements 21r, 21g, 21b to the dichroic prism DP.

In FIG. 10 symbols 21r, 21g, and 21b denote the image display elements for red (R), for green (G), and for blue (B). Symbols 22r, 22g, and 22b represent the polarizers as analyzers for the light from the image display elements.

Figure 11:
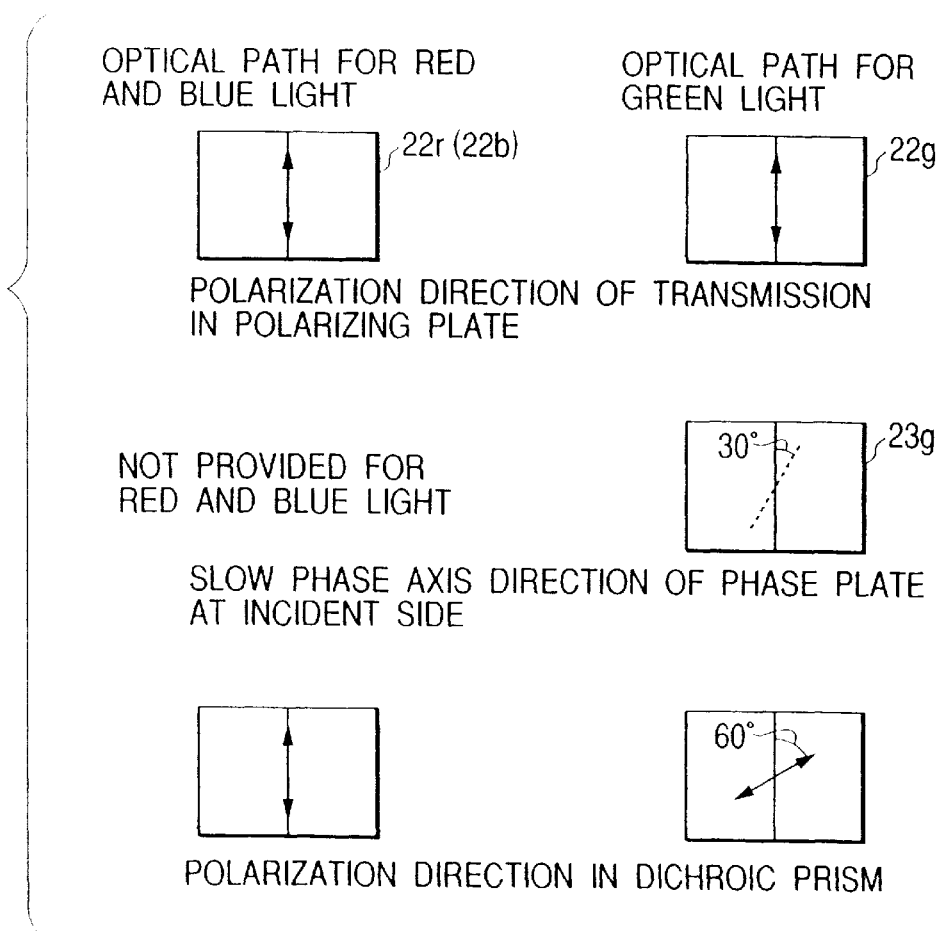
FIG. 11 is a diagram to explain the polarization directions of projected light in Embodiment 3 of the present invention.

Symbol 23g denotes the half-wave plate for converting the polarization direction of the green light, which is placed in the optical path of the green light. The directions of polarization in the respective optical elements used in the present embodiment are presented in FIG. 11. At each image display element 21, the direction indicated by the arrows in the figure is the polarization direction of the image light, this direction being parallel to the direction of the s-polarized light component in the dichroic prism. At the polarizers 22r, 22b, 22g, the direction indicated by the arrows in the drawing is the transmission polarization direction, this direction being set in parallel (0°) to the polarization direction of the image light from the image display elements. At the half-wave plate 23g, the direction indicated by the dotted line in the figure is the slow axis direction, this direction being set at 30° relative to the direction of the s-polarized light component in the dichroic prism.

Based on this arrangement, the red and blue light enters the dichroic prism while the polarization direction of the red and blue light is kept parallel to the s-polarized light component in the dichroic films of the dichroic prism DP. The polarization direction of the green light is converted by the phase plate 23g, so that the angle is set to 60° between the polarization direction of the green light transmitted by all the dichroic films and the polarization direction of the red and blue light once reflected by the dichroic film. This accomplishes the effect similar to that in Embodiment 1.

Figure 12:
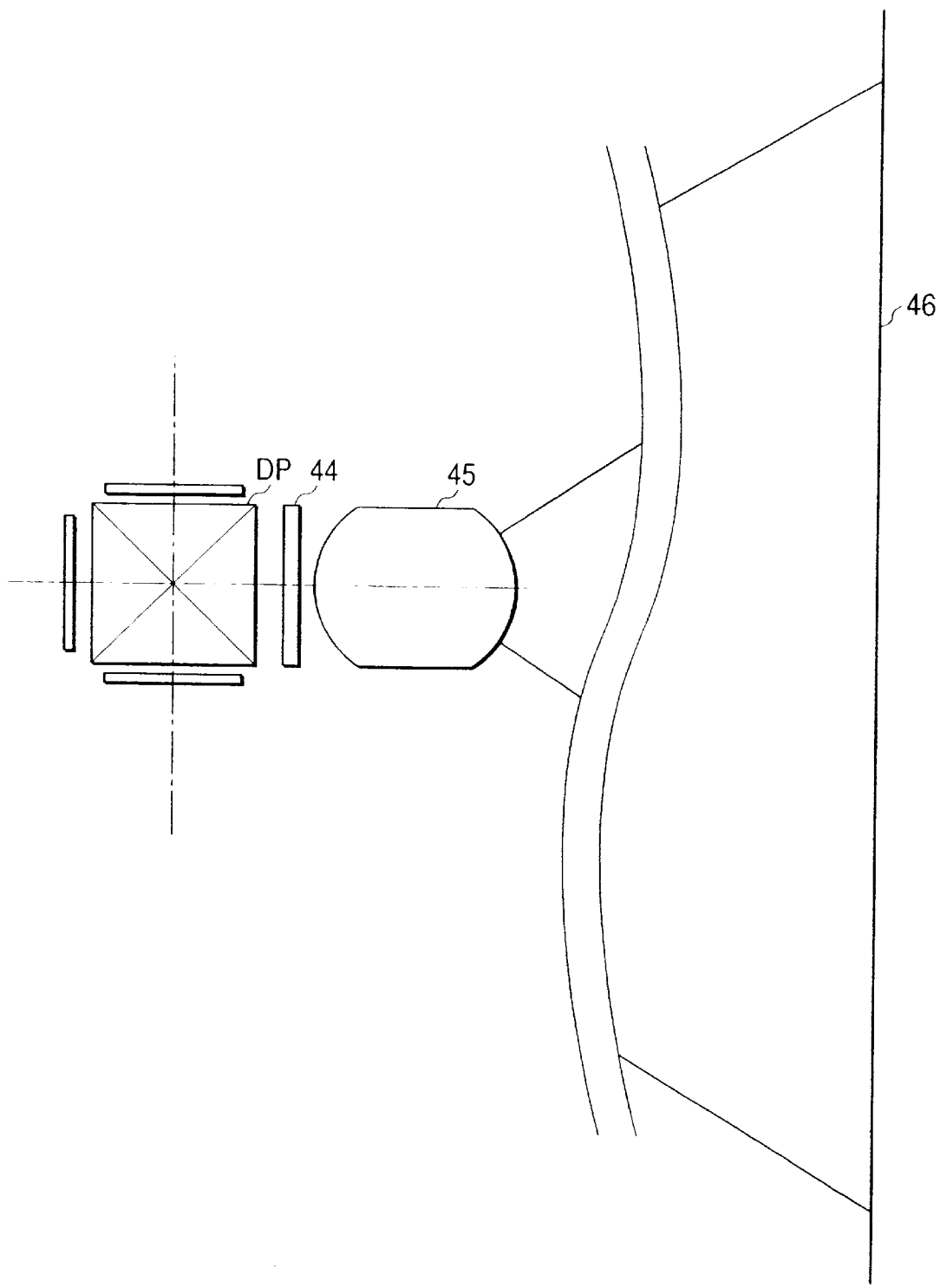
FIG. 12 is a schematic diagram to show the major part of a portion of Embodiment 4 of the present invention.

FIG. 12 is a schematic diagram to show the major part of a portion of Embodiment 4 of the present invention. In FIG. 12 symbol DP represents the dichroic prism, and 44 the half-wave plate for converting the polarization direction of the composite light. Numeral 45 denotes the projection lens, and 46 the polarizing screen.

Figure 13A:
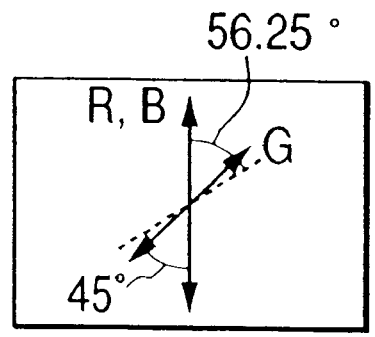
FIG. 13A and FIG. 13B are diagrams to explain the polarization directions of projected light in Embodiment 4 the present invention.
Figure 13B:
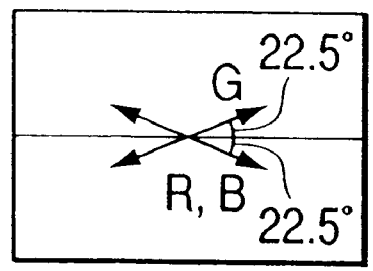

The present embodiment also has the structure as described in Embodiments 1 to 3; that is, the polarization direction of the red and blue light once reflected by the dichroic film and emerging from the dichroic prism DP is converted into that of the s-polarized light to the dichroic films of the dichroic prism DP, and the polarization direction of the green light is inclined at 45°, which is larger than 0° but smaller than 90°, relative to the polarization direction of the red and blue light. Relations of the slow axis direction of the half-wave plate 44 and the transmission polarization direction of the polarizing screen 46 against the polarization directions of this projected light in Embodiment 4 are presented in FIGS. 13A and 13B. FIG. 13A shows the relationship between the polarization directions of the beams (R, B, and G light) emerging from the dichroic prism and the slow axis direction (dotted line) of the half-wave plate 44, and FIG. 13B shows the relationship between the polarization directions of the beams (R, B, and G light) projected onto the polarizing screen 46 and the transmission axis direction of the polarizing screen.

In FIG. 13A, the slow axis direction of the half-wave plate 44 is indicated by the dotted line, which is set at the angle of 56.25° relative to the s-polarized light direction in the dichroic films of the dichroic prism DP. Therefore, the light having passed through the half-wave plate 44 is converted into light of the polarization direction each inclined at 22.5° relative to the p-polarized light direction in the dichroic films of the dichroic prism DP. Since the transmission polarization direction of the polarizing screen 46 is set perpendicular to the s-polarized light direction in the dichroic films of the dichroic prism DP, the rate of the light that can be utilized for observation without being absorbed by the screen 46, is computed as follows.

$$\cos^2(22.5)=0.853$$

This means that 85.3% of the projected light is allowed to pass through the polarizing screen and to be utilized.

In Embodiments 1 and 4 the phase plate may also be arranged to be rotatable about the axis of rotation along the direction parallel to the optical axis of the projection lens, without being fixed. This permits the polarization direction of the projected light to be converted into an optimal state no matter how the transmission polarization direction of the polarizing screen is oriented.

Next described is Embodiment 5 as an image observation apparatus of the present invention. The systems commonly used for observing a stereoscopic picture by use of the image projection apparatus are stereoscopic image projection systems using two image projection devices PJ1, PJ2 in such structure that the projectors PJ1, PJ2 project enlarged images of right eye image and left eye image (or left eye image and right eye image) onto the screen Sc having the property of preserving the polarization states thereof and that the images are observed through polarizing glasses provided with polarizing plates of polarization components perpendicular to each other for the left and right eyes. The present embodiment concerns such a system.

FIG. 14 is a schematic diagram to show the major part of the stereoscopic image projection system according to Embodiment 5 of the present invention. In FIG. 14 each of the image projection devices PJ1, PJ2 has a color combining system of the structure as stated in Embodiments 1 to 4, in which the polarization direction of the red and blue light emerging from the dichroic prism is set to that of the s-polarized light to the dichroic films of the dichroic prism and in which the polarization direction of the green light is inclined at 45°, which is larger than 0° but smaller than 90°, relative to the polarization direction of the red and blue light.

Figure 15A:
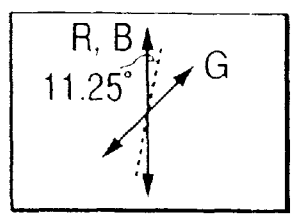
FIG. 15A, FIG. 15B, and FIG. 15C are diagrams to explain the polarization directions of projected light in Embodiment 5 of the present invention.

A filter PF1 or PF2 comprised of a half-wave plate and a polarizer is located at the exit part of the projection lens of each image projector PJ1, PJ2. Relations of the slow axis direction of the half-wave plate and the transmission polarization direction of the polarizer of the filter PF1 against the polarization directions of the projected light emerging from the dichroic prism DP in the image projector PJ1 are presented in FIGS. 15A to 15C. FIG. 15A shows the relationship between the polarization directions of the beams (R, B, and G light) emerging from the dichroic prism DP and the slow axis (indicated by the dashed line) of the half-wave plate of the filter PF1, FIG. 15B the relationship between the polarization directions of the beams (R, B, and G light) transmitted by the half-wave plate of the filter PF1 and the transmission direction A (indicated by the dashed line) of the polarizer of the filter PF1, and FIG. 15C the polarization direction of the light projected to the screen Sc.

Figure 15B:
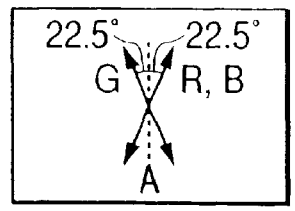
Figure 15C:
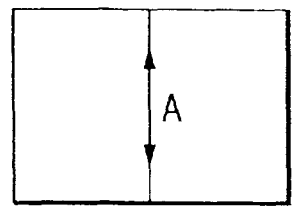
Figure 16A:
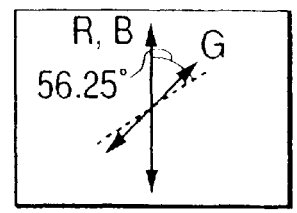
FIG. 16A, FIG. 16B, and FIG. 16C are diagrams to explain the polarization directions of projected light in Embodiment 5 of the present invention.

In FIGS. 15A to 15C, the slow axis direction of the half-wave plate indicated by the dotted line is set at the angle of 11.25° relative to the direction of the s-polarized light in the dichroic films of the dichroic prism DP, the light transmitted by the half-wave plate is converted each into light of the polarization direction inclined at 22.5° relative to the direction of the s-polarized light in the dichroic films of the dichroic prism DP, and the transmission polarization direction A of the polarizer of the filter PF1 is set in parallel to the direction of the s-polarized light in the dichroic films of the dichroic prism DP. Relations of the slow axis direction of the half-wave plate and the transmission polarization direction of the polarizer of the filter PF2 against the polarization directions of the projected light emerging from the dichroic prism DP in the image projector PJ2 are presented in FIGS. 16A to 16C. FIG. 16A shows the relationship between the polarization directions of the beams (R, B, and G light) emerging from the dichroic prism DP and the slow axis (indicated by the dashed line) of the half-wave plate of the filter PF2, FIG. 16B the relationship between the polarization directions of the beams (R, B, and G light) transmitted by the half-wave plate of the filter PF2 and the transmission direction A (indicated by the dashed line) of the polarizer of the filter PF2, and FIG. 16C the polarization direction of the light projected to the screen Sc.

Figure 16B:
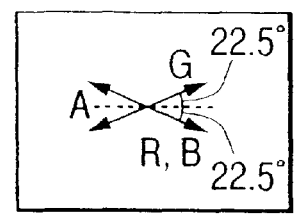
Figure 16C:
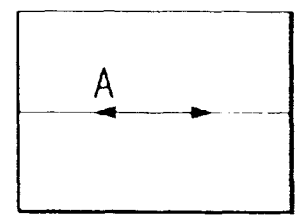
Figure 17:
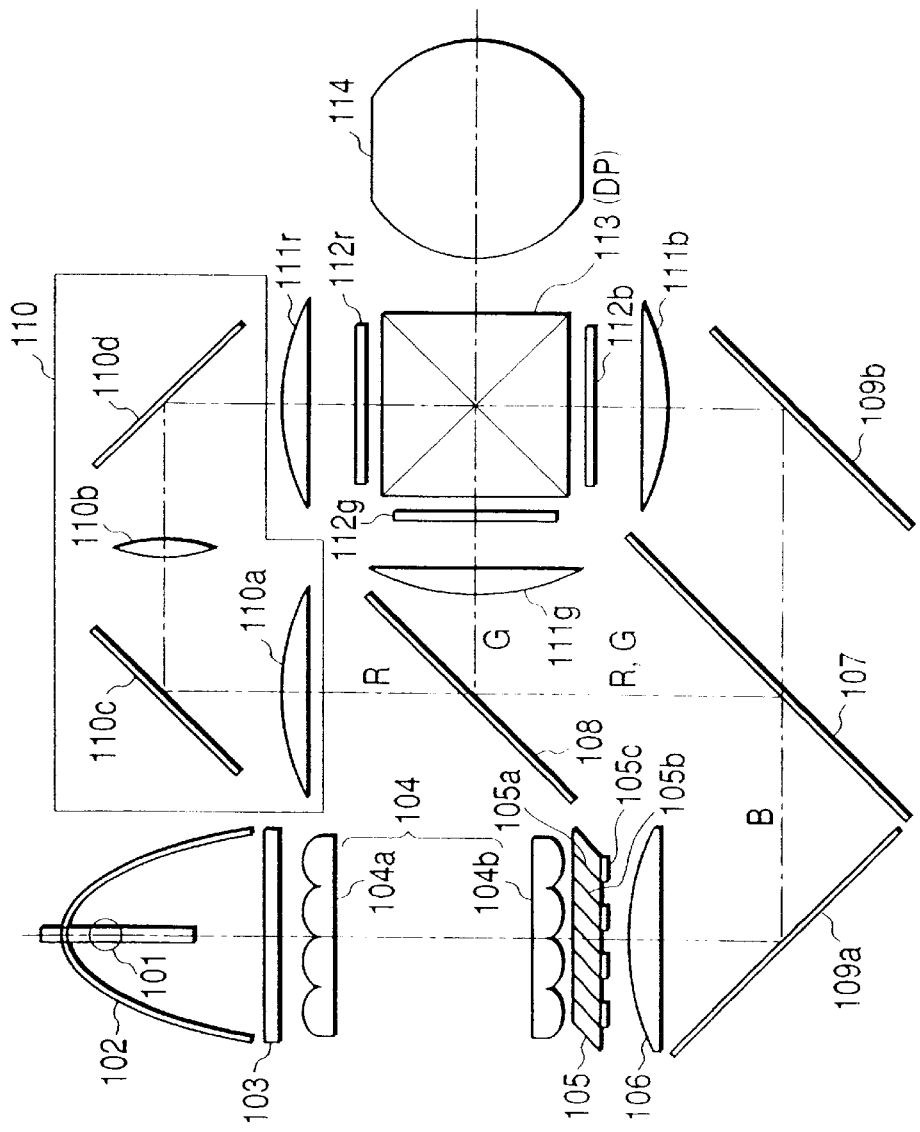
FIG. 17 is a diagram to explain the structure of the conventional projection apparatus.
Figure 18:
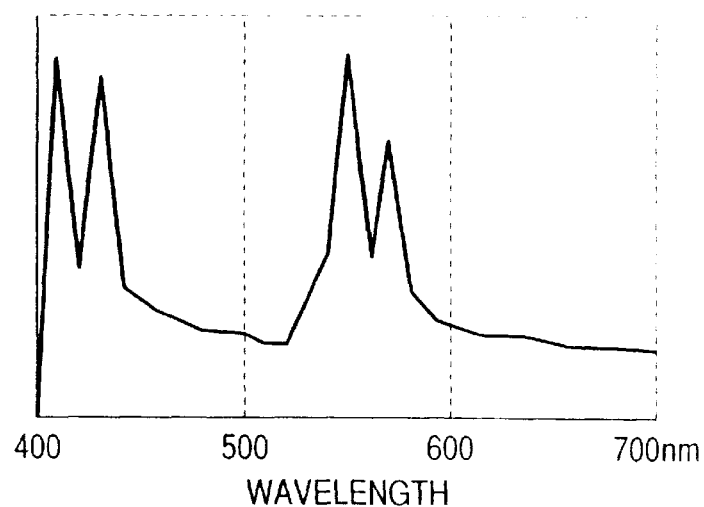
FIG. 18 is a diagram for explaining the characteristics of the color separating system in the conventional example.
Figure 19:
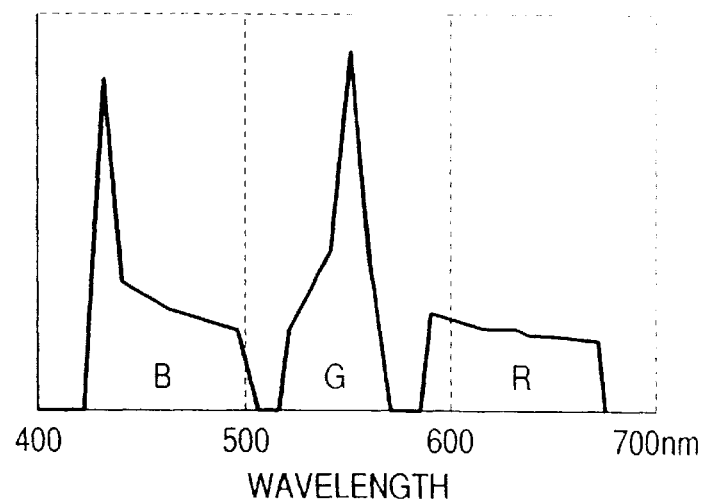
FIG. 19 is a diagram for explaining the characteristics of the color separating system in the conventional example.
Figure 20:
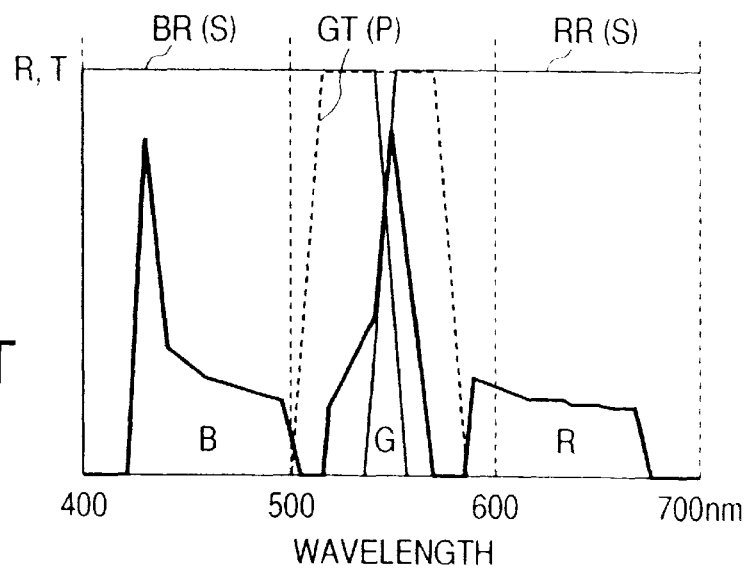
FIG. 20 is a diagram for explaining the characteristics of the color separating system in the conventional example.
Figure 21:
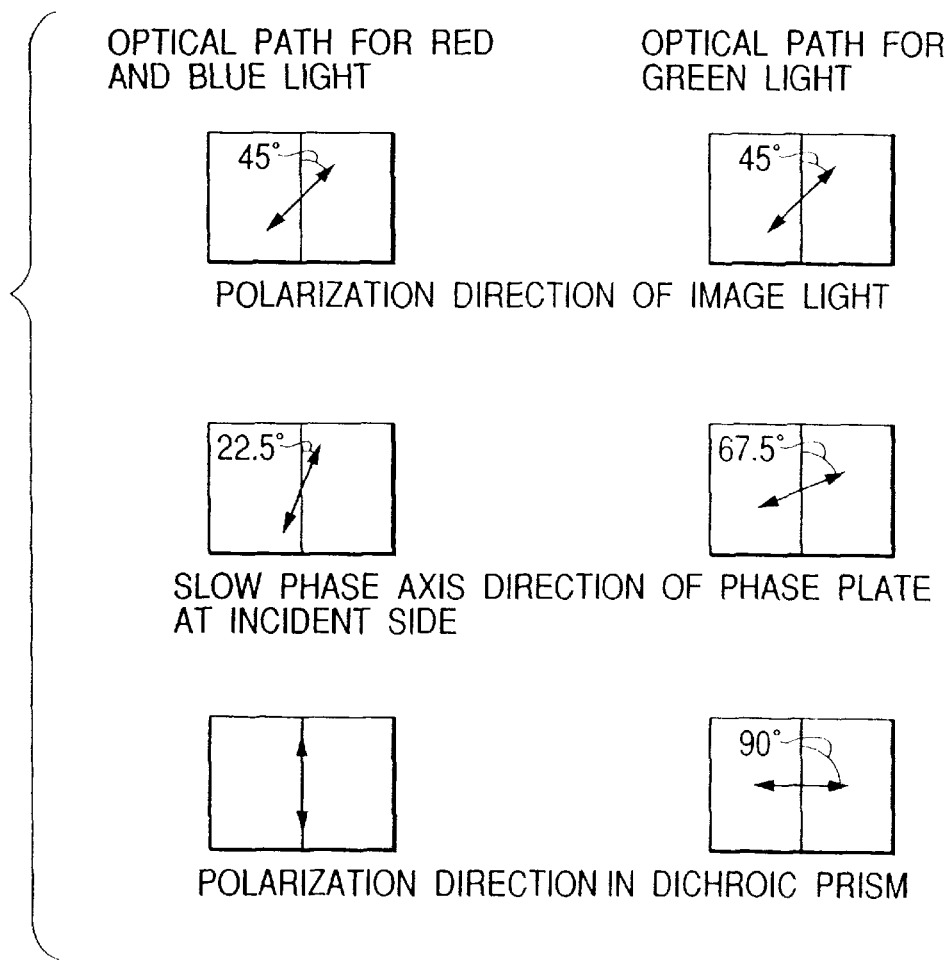
FIG. 21 is a diagram to explain the polarization directions of projected light in the conventional example.
Figure 22A:
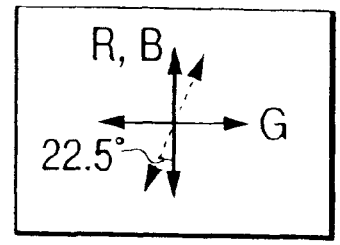
FIG. 22A and FIG. 22B are drawings to explain the polarization directions of projected light to the polarizing screen in the conventional example.
Figure 22B:
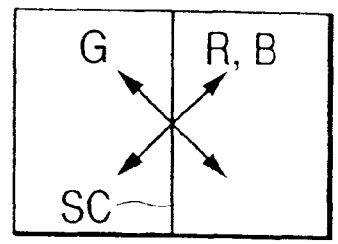
Figure 23A:
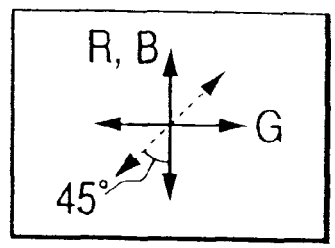
FIG. 23A and FIG. 23B are drawings to explain the polarization directions of projected light to the polarizing screen in the conventional example.
Figure 23B:
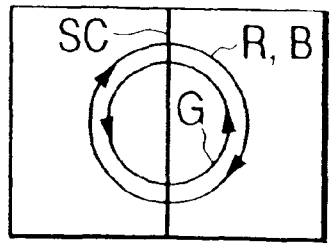
Figure 24:
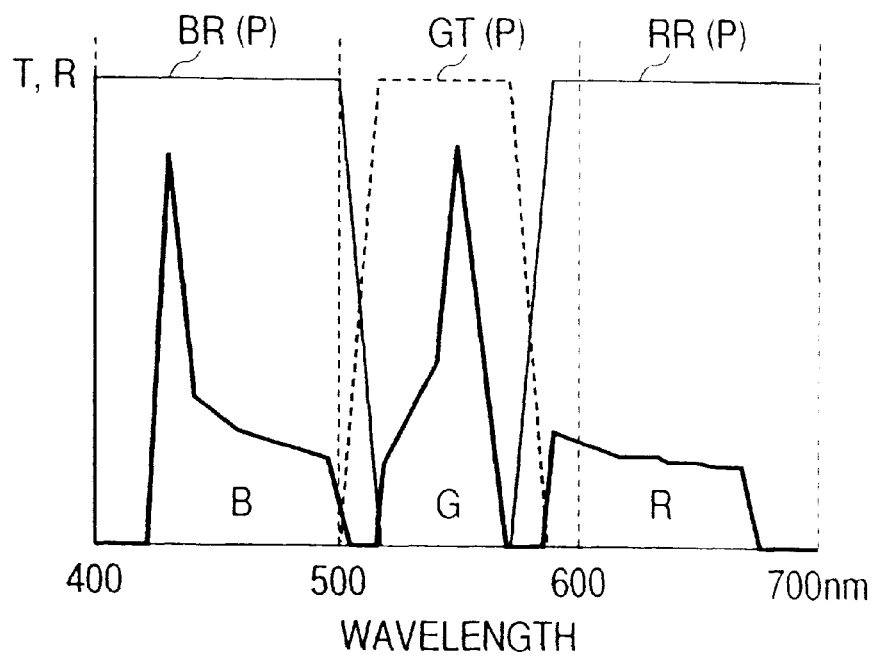
FIG. 24 is a diagram for explaining the characteristics of the color separating system in another conventional example.

In FIGS. 16A to 16C, the slow axis direction (dotted line) of the half-wave plate is set at the angle of 56.25° relative to the s-polarized light direction in the dichroic films of the dichroic prism DP, the light transmitted by the half-wave plate is converted each into light of the polarization direction inclined at 22.5° relative to the p-polarized light direction in the dichroic films of the dichroic prism, and the transmission polarization direction A of the polarizer of the filter PF2 is set perpendicular to the s-polarized light direction in the dichroic films of the dichroic prism DP.

This permits such setting that the polarization direction of the light projected from the image projector PJ1 is perpendicular to that of the light projected from the image projector PJ2. The images are projected onto the screen having the property of being capable of reflecting incident light while maintaining polarization states of the incident light. When the images are observed through the polarizing glasses provided with the polarizers having the respective transmission polarization axes perpendicular to each other, for the right eye and for the left eye, the parallax image for the right eye is guided to the right eye and the parallax image for the left eye is guided to the left eye, thus permitting the observer to observe a stereoscopic image.

What is claimed is:

1. A projection apparatus comprising means for supplying light, a color separating system for separating the light from said means into a plurality of color beams, a plurality of light modulating elements for modulating the respective color beams separated by the color separating system, based on an image signal, a color combining system for combining the color beams emerging from the respective light modulating elements, a projection optical system for projecting composite light of the color beams combined by the color combining system onto a plane, and a half-wave plate disposed between said color combining system and said plane, wherein the color combining system comprises a plurality of dichroic films, each of the color beams incident to the dichroic films is a linearly polarized light, and the following relation is met:

$0°<\theta<90°$ where $\theta$ is an angle between a polarization direction of a first color beam component transmitted by all the dichroic films upon incidence of said first color beam component on the dichroic films and a polarization direction of a second color beam component reflected by one of the dichroic films upon incidence of said second color beam component on said one of the dichroic films.

2. The projection apparatus according to claim 1, wherein the polarization direction of the second color beam component reflected by one of said dichroic films is s-polarized light to the dichroic films.

3. The projection apparatus according to claim 1, wherein said angle $\theta$ satisfies the following relation:

$0°<\theta<80°$.

4. The projection apparatus according to claim 1, wherein said angle $\theta$ satisfies the following relation:

$0°<\theta<60°$.

5. The projection apparatus according to claim 1, wherein said angle $\theta$ satisfies the following relation:

$0°<\theta<45°$.

6. The projection apparatus according to claim 1, wherein said angle $\theta$ satisfies the following relation:

$\theta=45°$.

7. A projection apparatus comprising means for supplying light, a color separating system for separating the light from said means into a plurality of color beams, a plurality of light modulating elements for modulating the respective color beams separated by the color separating system, based on an image signal, a color combining system for combining the color beams emerging from the respective light modulating elements, and a projection optical system for projecting composite light of the color beams combined by the color combining system, onto a polarizing screen, wherein the color combining system comprises a plurality of dichroic films, each of the color beams incident to the dichroic films is a linearly polarized light, and the following relation is met:

$0°<\theta<90°$ where $\theta$ is an angle between a polarization direction of a first color beam component transmitted by all the dichroic films upon incidence of said first color beam component on the dichroic films and a polarization direction of a second color beam component reflected by one of the dichroic films upon incidence of said second color beam component on said one of the dichroic films, and wherein a half-wave plate is placed in an optical path from the color combining system to the polarizing screen, and an angle between the polarization direction of the first color beam component transmitted by all the dichroic films and a transmission polarization direction of the polarizing screen is substantially equal to an angle between the polarization direction of the second color beam component reflected by one of the dichroic films and the transmission polarization direction of the polarizing screen.

8. The projection apparatus according to claim 7, wherein said half-wave plate is provided at an exit side of a projection lens of said projection optical system.

9. The projection apparatus according to claim 7, wherein said half-wave plate is provided between said color combining system and a projection lens of said projection optical system.

10. The projection apparatus according to claim 7, wherein a slow phase axis of said half-wave plate rotates about an optical axis of said projection optical system.

11. A projection apparatus comprising means for supplying a plurality of color light beams, a plurality of light modulating elements for modulating the respective color beams, based on an image signal, a color combining system which has a plurality of dichroic films for combining the color beams emerging from the respective light modulating elements, a projection optical system for projecting composite light of the color beams combined by the color combining system onto a plane, and a half-wave plate disposed between said color combining system and said plane, wherein each of the color beams incident to the dichroic films of said color combining system is converted into linearly polarized light, and the following relation is met:

$$0° < \theta < 90°$$

where θ is an angle between a polarization direction of a first color beam component transmitted by all the dichroic films upon incidence of said first color beam component on the dichroic films and a polarization direction of a second color beam component reflected by one of the dichroic films upon incidence of said second color beam component on said one of the dichroic films.

12. The apparatus according to claim 11, wherein a half-wave plate is provided at an exit side of a projection lens of said projection optical system.

13. The apparatus according to claim 11, wherein a half-wave plate is provided between said color combining system and a projection lens of said projection optical system.

14. The apparatus according to claim 12, wherein a slow phase axis of said half wave plate rotates about an optical axis of said projection optical system.

15. An observation apparatus with which an observer, wearing polarizing glasses to which light beams of polarization states different from each other are incident selectively to a left eye and to a right eye, observes a stereoscopic image from parallax images projected onto a polarizing screen, which preserves polarization directions, by first and second projection devices, wherein each of said first and second projection devices comprises means for supplying light, a color separating system for separating the light from said means into a plurality of color beams, a plurality of light modulating elements for modulating the respective color beams separated by the color separating system, based on an image signal, a color combining system comprising a cross dichroic prism with dichroic films on joint surfaces between four prisms, for combining the color beams emerging from the respective light modulating elements, a projection optical system for projecting composite light of the color beams combined by the color combining system, onto the polarizing screen, and a polarizer placed in an optical path from the cross dichroic prism to the polarizing screen, said polarizer having a polarization axis directed along a direction which bisects an angle between a polarization direction of a first color beam component transmitted by all the dichroic films and a polarization direction of a second color beam component reflected by one of the dichroic films, wherein each of the color beams incident to the dichroic films is a linearly polarized light, and the following relation is satisfied:

$$0° < \theta < 90°$$

where θ is the angle between the polarization direction of the first color beam component transmitted by all the dichroic films upon incidence of said first color beam component on the dichroic films and the polarization direction of the second color beam component reflected by one of the dichroic films upon incidence of said second color beam component on said one of the dichroic films, and wherein a phase plate capable of altering a polarization state of light is set at an exit position of an image projection optical system of at least one of the first and second image projection devices, whereby polarization states of light beams projected from the two projection devices are made different from each other.

16. The observation apparatus according to claim 15, wherein said angle θ satisfies the following relation:

$$0° < \theta < 80°.$$

17. The observation apparatus according to claim 15, wherein said angle θ satisfies the following relation:

$$0° < \theta < 60°.$$

18. The observation apparatus according to claim 15, wherein said angle θ satisfies the following relation:

$$0° < \theta < 45°.$$

19. The observation apparatus according to claim 15, wherein said angle θ satisfies the following relation:

$$\theta = 45°.$$

20. A system for projecting a video picture by the projection apparatus as set forth in claim 1, 7, 11, or 15.

21. A system for projecting an image produced by a computer, by the projection apparatus as set forth in claim 1, 7, 11, or 15.

22. The apparatus according to claim 1, 7, 11, or 15, wherein θ=80°.

* * * * *

UNITED STATES PATENT AND TRADEMARK OFFICE
CERTIFICATE OF CORRECTION

PATENT NO.     : 6,513,677 B1                                    Page 1 of 1
DATED          : February 4, 2003
INVENTOR(S)    : Sorensen et al.

It is certified that error appears in the above-identified patent and that said Letters Patent is hereby corrected as shown below:

Column 22,
Line 63, "door:opening" should read -- door opening --

Column 29,
Line 12, "die" should read -- the --

Column 32,
Line 16, "apparatus of 10" should read -- apparatus of claim 10 --

Signed and Sealed this

Twenty-second Day of July, 2003

JAMES E. ROGAN
*Director of the United States Patent and Trademark Office*